United States Patent [19]
Fradin

[11] Patent Number: 5,984,284
[45] Date of Patent: Nov. 16, 1999

[54] PROTECTIVE DEVICE FOR CYCLES FIXED ONTO A REAR HARNESS FOR VEHICLES

[76] Inventor: Philippe Fradin, 10, Villa Dedouvre, Ermont, France, 95120

[21] Appl. No.: 08/875,757

[22] PCT Filed: Nov. 4, 1996

[86] PCT No.: PCT/FR96/01727

§ 371 Date: Aug. 7, 1997

§ 102(e) Date: Aug. 7, 1997

[87] PCT Pub. No.: WO97/18121

PCT Pub. Date: May 22, 1997

[30] Foreign Application Priority Data

Nov. 14, 1995 [FR] France .................................. 95 13452

[51] Int. Cl.⁶ ..................................................... B62J 23/00
[52] U.S. Cl. ............................................ 267/136; 224/924
[58] Field of Search ..................................... 267/118, 120, 267/136, 137, 182, 139; 206/821; 224/924; 410/87; 248/638

[56] References Cited

U.S. PATENT DOCUMENTS

| | | | |
|---|---|---|---|
| 3,581,962 | 6/1971 | Osborn | 224/42.1 |
| 3,710,999 | 1/1973 | Allen | 224/42.03 B |
| 4,009,744 | 3/1977 | Joslyn | 224/42.03 B |
| 4,378,883 | 4/1983 | Profeta . | |
| 4,435,463 | 3/1984 | Roellchen | 206/821 X |
| 4,676,414 | 6/1987 | Deguevara | 224/924 |
| 4,944,340 | 7/1990 | Tortorich | 224/924 |
| 4,976,389 | 12/1990 | McLellan et al. | 224/924 X |
| 4,991,715 | 2/1991 | Williams . | |
| 5,282,555 | 2/1994 | Muir et al. . | |

FOREIGN PATENT DOCUMENTS 0 439 155   7/1991   European Pat. Off. .

*Primary Examiner*—Peter M. Poon
*Attorney, Agent, or Firm*—Oblon, Spivak, McClelland, Maier & Neustadt, P.C.

[57] ABSTRACT

A spacer slab of semi-rigid foam which is provided to be brightly fluorescent and/or brightly colored. This spacer slab is provided with a longitudinal opening to permit the slab to be easily inserted over and retained between cycle mounting pins of a cycle holding harness which is attached to a vehicle. One of the slabs can be provided between each of the cycles as well as between the first cycle and the harness itself. The opening extending in the noted longitudinal direction between the cycle mounting pins to also provide for reduced wind resistance. In addition, upper and/or lower extensions can be provided at each side of the opening in the slab to protect upper and lower parts of the cycles. Also, a middle extension can be extended from each side of the slab opposite the opening to protect middle portions of the cycle or cycles to be mounted on the harness.

9 Claims, 2 Drawing Sheets

PROTECTIVE DEVICE FOR CYCLES FIXED ONTO A REAR HARNESS FOR VEHICLES

DESCRIPTION

1. Field of the Invention

The object of this invention is a device for the protection of cycles associated with a harnessing structure fixed onto vehicles and notably automobiles.

The invention is related to the technical sector of apparatus, structures, and supports for bicycles and similar products of the same type which can be transported by vehicles.

2. Prior art and the problem posed

According to present day practice, harnesses are used for one or several cycles, such as all terrain vehicles, or bicycles fixed to the outside of the rear of vehicles with a boot or with a tailgate. The cycles arranged in this way are in direct contact with each other, which has the results :

of damaging the frame of each cycle; and of damaging the equipment, notably safety equipment.

SUMMARY OF THE INVENTION

The device according to the invention allows these disadvantages to be remedied by suggesting a reliable, simple and inexpensive solution. It is positioned between the cycles, using the pins on the harness, with the option of positioning it between the harness and the first cycle, in order to protect the latter during transport and to provide stability and to increase the visibility of the harness.

To this effect, the main objective of the invention is a device for protecting cycles linked to a harnessing structure provided with pins and fixed to a vehicle. The device is characterised in that it is made up of a spacer slab made of shock absorbing material and which includes at least one opening that allows its attachment by engaging it around pins of the harness, between the transported cycles, and between the first cycle and the harness on the vehicle side.

The various embodiment characteristics and the options are described in the subsidiary claims.

DETAILED DESCRIPTION OF AN EMBODIMENT OF THE INVENTION

Other characteristics or advantages of the invention will be better understood on reading the detailed description which follows, illustrated by the appended drawings :

FIG. 1 shows the device according to the invention fitted onto the two forks 3 of a fixing harness for cycles on the rear of an automobile. One may also see a bicycle placed below the device.

The device is mainly constituted by a spacer slab 1 made of shock absorbing material having at least one central opening 2. The fine lines in the middle of the opening 2 diagramatically express the possible dividing up of this opening 2 into two parts in order to be able to fit a central reinforcement 10 that improves the rigidity of the device.

Figure 1:
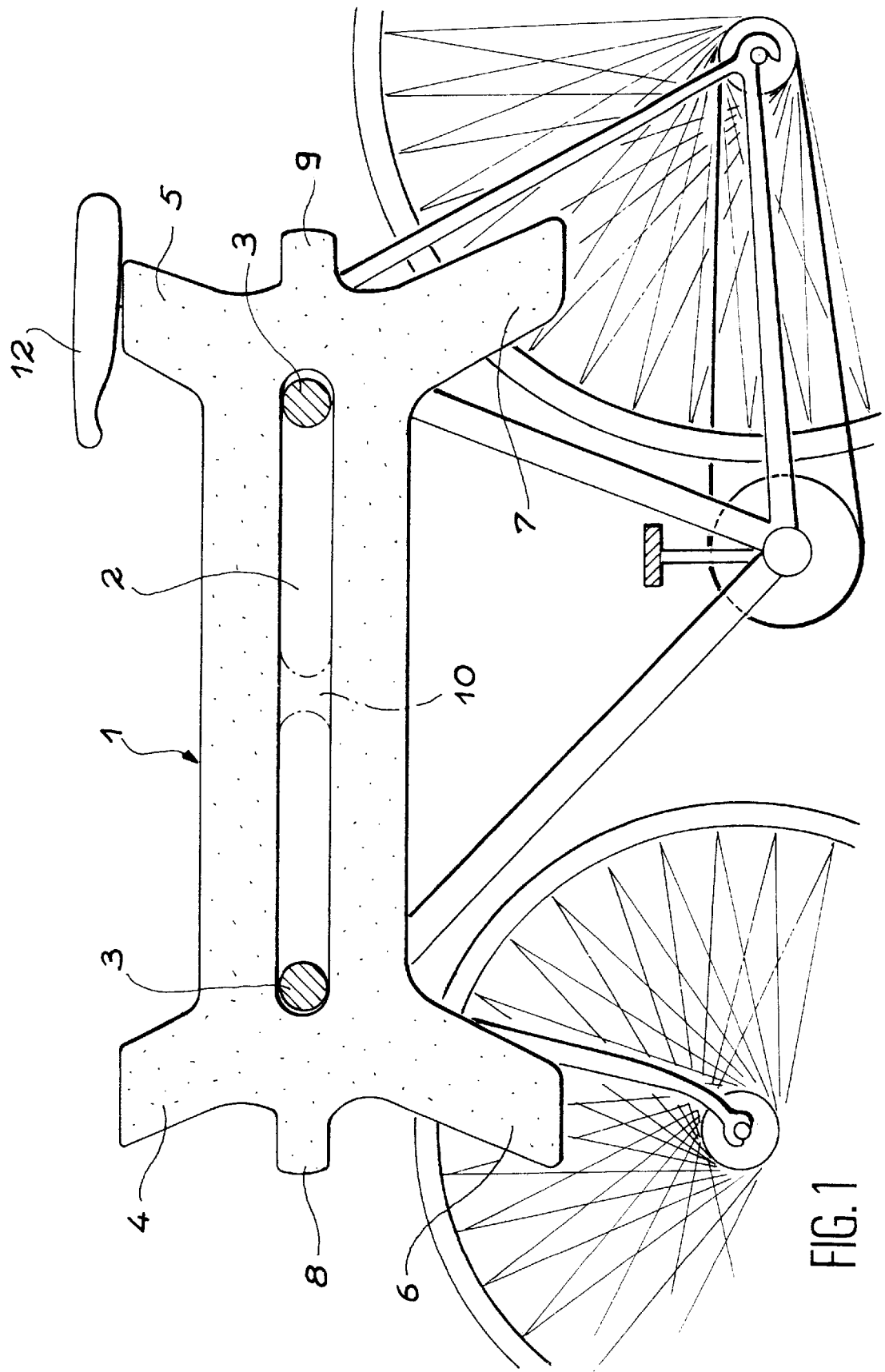
FIG. 1 represents the device according to the invention in its using position.
Figure 2:
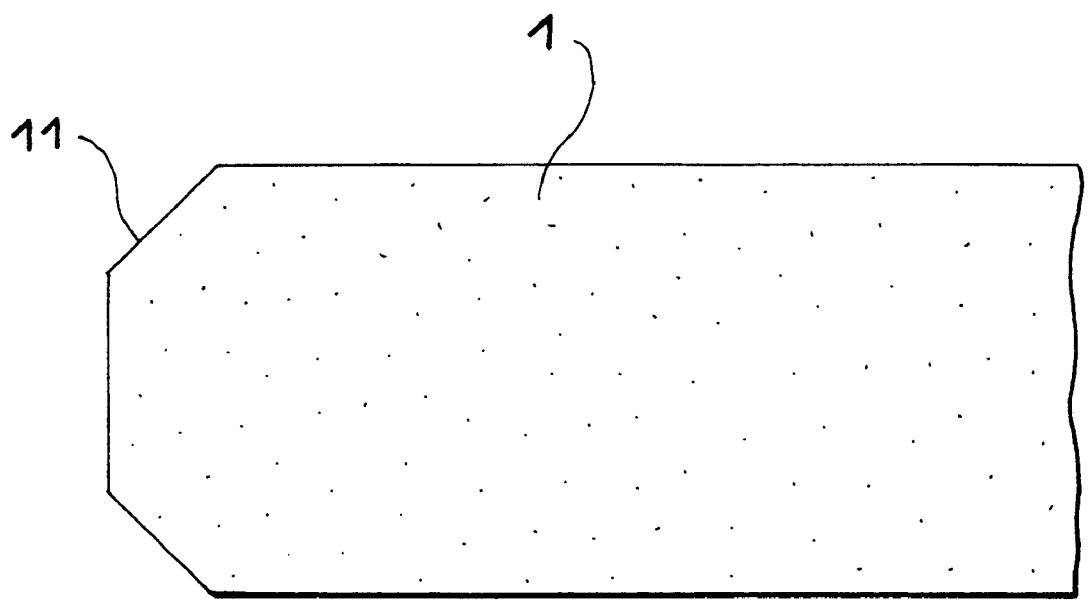
FIG. 2 represents a partial section of the device according to the invention.

While referring simultaneously to FIG. 2, it is understood that, if the device according to the invention, that is to say the spacer slab 1, has a thickness of about 40 cm, it constitutes a cross piece that slightly spaces apart the bicycle shown on FIG. 1 from the following bicycle to be stacked on the harness.

Returning to FIG. 1, one observes the presence of a left lateral extension 4 and a right lateral extension 5 on the upper part of the spacer slab 1. These two lateral extensions 4 and 5 have the effect of improving the protection of the saddle 12, and of certain parts of the handlebars not shown and, more generally, of the whole of the upper parts of the cycle or cycles being transported.

Similarly, a left lateral extension 6 and a right lateral extension 7 are provided on the lower part of the device. They have the effect of improving the protection of the brakes and the forks and, in a general manner of the whole of the lower parts of the cycle or cycles being transported.

One can equally observe the presence of a distal left extension 8 and a distal right extension 9 positioned in a central way in the central opening 2. They have the effect of improving the protection of the middle parts of the cycle or cycles being transported.

One may note the relatively slender shape of the spacer slab 1 which permits a reduction in the wind resistance of the harnessed assembly.

The width and the length of the opening or openings 2 depend (s) mainly on the more or less standardised position of the pins 3 of the fixing harness. One understands that this position can be easily modified in relation to changes in the position of these harnessing pins.

One of the materials used to produce the spacer slab according to the invention is a semi-rigid material such as double density polyethylene. One may use a polyethylene having a central volumetric weight of 40 kg/m$^3$ and a surface volumetric weight of 100 kg/m$^3$. Polyurethane may also be used.

With the aim of making the system visible, that is to say able to incorporate an element that indicates the harness for vehicles following the automobile on which the device is being used, according to the invention, the spacer slab can be of a bright color. The surface crust of the spacer slab 1 can easily be produced in red or in bright yellow.

By way of a non-limitative example, one can indicate that the spacer slab 1 can have a length of 90 cm, a height of 45 cm and a thickness of 4 cm. Aside from the fact that the device according to the invention avoids damage to the cycles positioned one upon the other, and to the harness which is susceptible to impacts from the cycles, it must be noted that putting it into place is relatively rapid and simple in relation to the complicated putting into place of various materials that are more or less suitable so as to arrive at the same goal.

I claim:

1. A device protecting a cycle or cycles linked to a harnessing structure provided with pins and fixed onto vehicles, comprising a spacer slab made of shock absorbing material and which includes at least one opening that allows attachment of the spacer slab relative to the pins of the harnessing structure by engaging the opening around the pins of the harnessing structure, with the spacer slab being positioned between each of the cycle or cycles being carried by the harnessing structure and between a first cycle and the harnessing structure on a side of the harnessing structure nearest the vehicle.

2. The device according to claim 1, wherein said spacer slab is made of a semi-rigid foam with closed cells having a thickness of at least 40 millimeters.

3. The device according to claim 1, wherein the opening extends in a longitudinal direction and reduces wind resistance.

4. The device according to claim 1, wherein said spacer slab includes lateral extensions on each side which extends in a generally upward direction and have the effect of improving protection of upper parts of the cycle or cycles.

5. The device according to claim 1, further including extensions on both sides of the spacer slab which extend in a downward direction and which have an effect of improving protection of lower parts of the cycle or cycles.

6. The device according to claim 1, wherein the spacer slab has distal extensions positioned at opposite sides of the opening which have the effect of improving the protection of middle parts of the cycle or cycles.

7. The device according to claim 1, wherein the shock absorbing material forming the spacer slab is double density polyethylene with a greater density at a spacer slab surface compared to density in a central portion of the spacer slab.

8. The device according to claim 1, wherein the spacer slab is provided with reflective or fluorescent indication means.

9. The device according to claim 8, wherein the shock absorbing material is double density polyethylene having a greater density at a surface of the spacer slab which is also provided with a bright color.

* * * * *